United States Patent [19]
Schubert

[11] 3,992,935
[45] Nov. 23, 1976

[54] METHOD AND APPARATUS FOR INDICATING TRACK CONDITIONS
[75] Inventor: Egon Schubert, Vienna, Austria
[73] Assignee: Franz Plasser Bahnbaumaschinen-Industrie-Gesellschaft m.b.H., Vienna, Austria
[22] Filed: Nov. 29, 1974
[21] Appl. No.: 528,033

Related U.S. Application Data
[60] Continuation of Ser. No. 362,319, May 21, 1973, abandoned, which is a continuation of Ser. No. 152,265, June 11, 1971, abandoned, which is a division of Ser. No. 822,966, May 8, 1969, Pat. No. 3,638,482.

[30] Foreign Application Priority Data
June 25, 1968 Austria .............................. 6104/68

[52] U.S. Cl. ................................................. 73/146
[51] Int. Cl.² ........................................ G01M 17/02

[58] Field of Search ................ 73/146; 33/144, 145

[56] References Cited
UNITED STATES PATENTS
3,383,913   5/1968   Swift ..................................... 73/146
FOREIGN PATENTS OR APPLICATIONS
543,425   5/1956   Italy ..................................... 73/146
209,931   12/1959   Netherlands .......................... 73/146

*Primary Examiner*—Donald O. Woodiel
*Attorney, Agent, or Firm*—Kurt Kelman

[57] ABSTRACT
Changes in acceleration caused by local track conditions are directly or indirectly measured as a car moves over a track section. The resultant signals are totalled to produce a signal or parameter characteristic of the track section condition, and this is compared with a comparison signal characteristic of a track condition norm.

9 Claims, 13 Drawing Figures

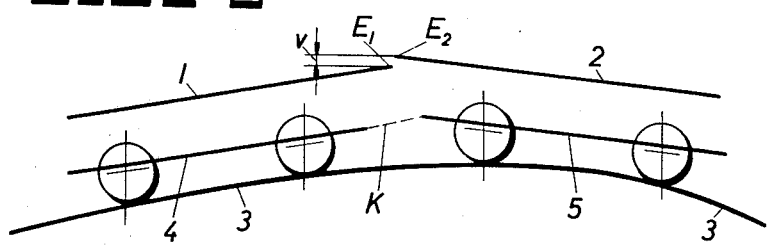
FIG. 2
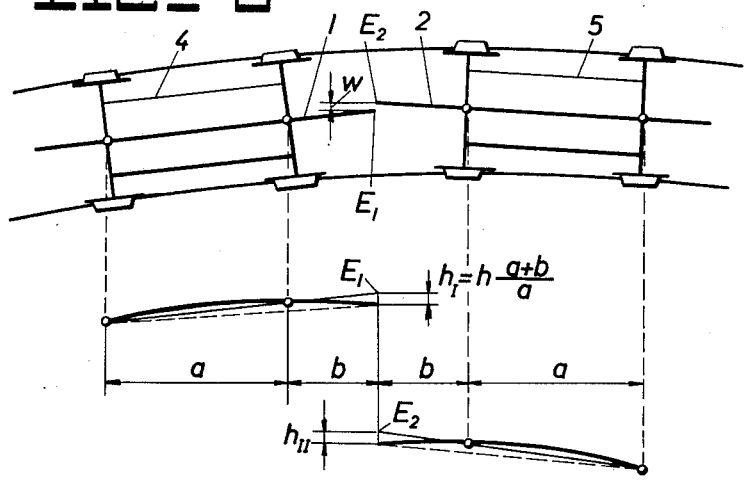
FIG. 3
FIG. 4
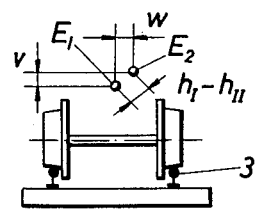
FIG. 5

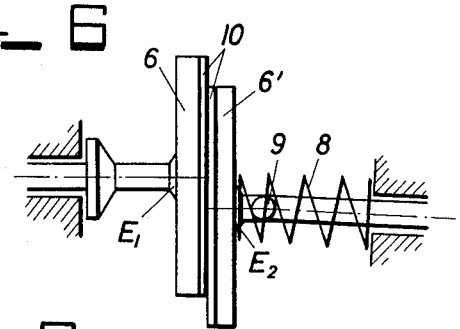
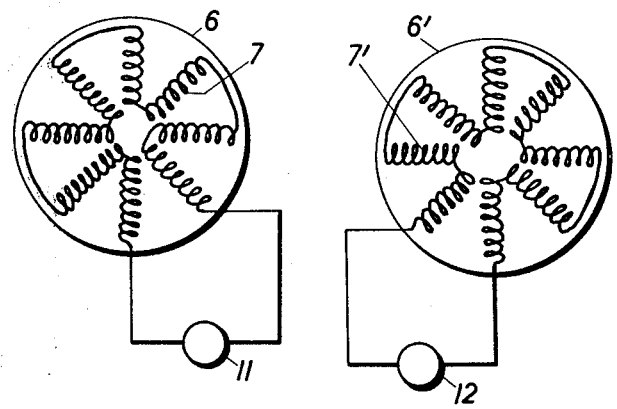
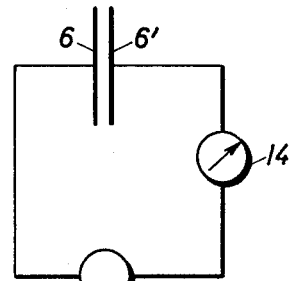
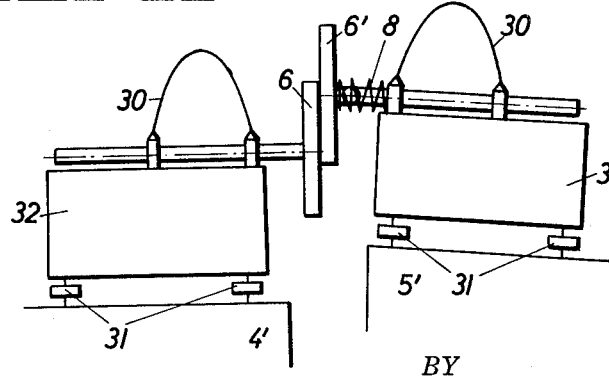

METHOD AND APPARATUS FOR INDICATING TRACK CONDITIONS

This is a continuation of my copending U.S. application Ser. No. 362,319, filed May 21, 1973 now abandoned, which was a continuation of Ser. No. 152,265, filed June 11, 1971, now abandoned, which was a division of my application Ser. No. 822,966, filed May 8, 1969, now U.S. Pat. No. 3,638,482.

BACKGROUND AND SUMMARY OF THE INVENTION

The present invention relates to improvements in track surveying.

In U.S. Pat. No. 3,643,503 filed Apr. 7, 1969, entitled "Track Surveying Method and Apparatus" and application Ser. No. 813,855, filed April 9, 1969 and abandoned in favor of Ser. No. 243,619, filed April 13, 1972, entitled "Track surveying", for instance, of which the present inventor is a joint inventor, track-measuring cars are disclosed which continuously measure and record parameters characteristic of the track condition, such as track gage, superelevation, curvature, grade, etc. Such surveys are designed to establish the safety of the track for given train speeds and determine when track maintenance work is required to bring the track back to the desired norm.

In modern, high-speed track maintenance operations, it is essential to determine the locations where track correction work must be done, and it has been proposed to use computers to evaluate signals characteristic of given measured track conditions, such as superelevation, grade and alignment. For instance, a norm may be established for each condition, i.e., curvature, superelevation, track gage, grade, these conditions may be continuously measured as a surveying car moves over the track, and deviations from the norm may be measured and fed to a computer which will determine when the track section falls below a given norm by counting the number of deviations in this section. While a variety of surveying methods have been tried, it has not been possible to set up a single characteristic value which generally indicates the entire track condition and is determinative of the safety of the track.

It is accordingly a primary object of the present invention to provide a railway track surveying apparatus which uses a single characteristic datum fully reflective of the track condition so that the quality of the track is established by this single parameter or signal.

This and other objects of this invention are accomplished by using as datum the acceleration changes caused by varying local track conditions in the track section being surveyed. The data are related to an assumed uniform speed of a vehicle passing over the track section and they are totalled to produce a parameter or signal characteristic of the track section condition, which signal or parameter is compared with a comparison parameter or signal characteristic of a track condition norm.

It has been found that this single datum related to the acceleration changes actually fully reflects all factors responsible for the quality of the track.

It is preferred to establish data corresponding to the acceleration changes in two mutually perpendicular planes, for instance one defined by the track and the other one perpendicularly extending in the direction of the track. The signals or parameters are separately measured in the two planes, preferably electrically or electronically, and then combined into a characteristic datum, preferably by a vector sum.

The acceleration changes may be measured directly, i.e., by an accelerometer mounted on a car moving over the track at a controllable and measurable speed.

It is also possible, however, to determine the acceleration changes indirectly without using a car with an accelerometer. For instance, changes in a parameter characteristic of successive portions of the track section may be measured, for instance the radii of successive circular arcs which are assumed to form the continuous track section. In this case, the faulty condition of the track section is considered as a succession of curves of the same mathematical function, for instance a series of successive circular arcs. A parameter of these successive curves and the changes in this parameter are measured, and the corresponding acceleration changes of an imaginary vehicle running over the track section is derived from these measurements and evaluated as though the acceleration changes themselves had been measured.

DETAILED DESCRIPTION OF DRAWING

The above and other objects, advantages and features of the present invention will become more apparent from the following detailed description of certain preferred embodiments of the invention, taken in conjunction with the accompanying drawing wherein FIG. 1 is a chart aiding in an understanding of the invention;

FIG. 2 is a schematic side view of an apparatus useful for carrying out the invention;

FIG. 3 is a top view of FIG. 2;

FIG. 4 illustrates the geometry of the measurements carried out by the apparatus of FIGS. 2 and 3;

FIG. 5 is a schematic front view of the apparatus of FIG. 2;

FIG. 6 and 6a illustrate measuring instruments useful in the apparatus of the invention;

FIG. 7 is a diagrammatic illustration of another useful measuring instrument;

Figure 8:
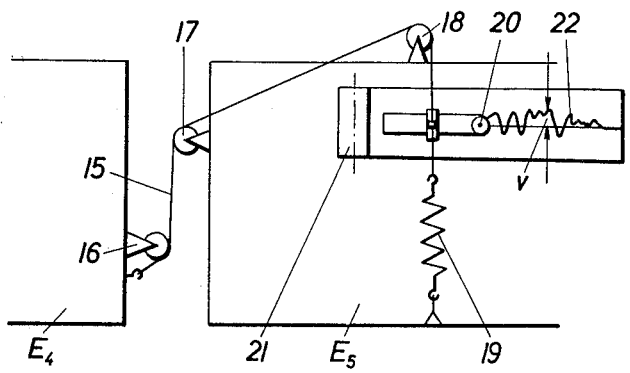
Figure 9:
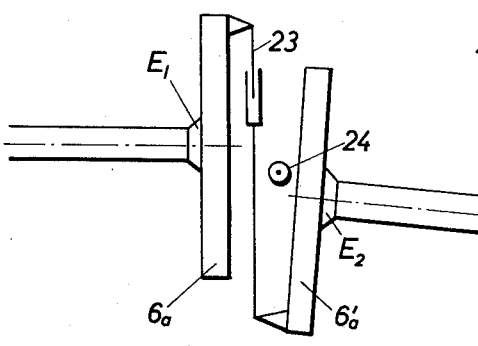
Figure 10:
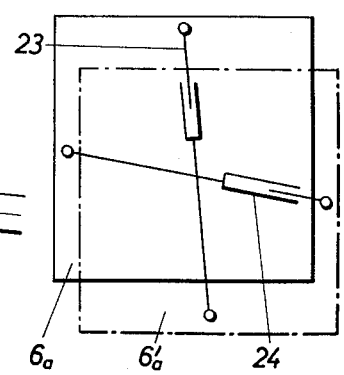

FIGS. 8, 9, 11 and 12 schematically show other embodiments of measuring instruments; and FIG. 10 is an end view of the instrument of FIG. 9.

DETAILED DESCRIPTION

Figure 1:
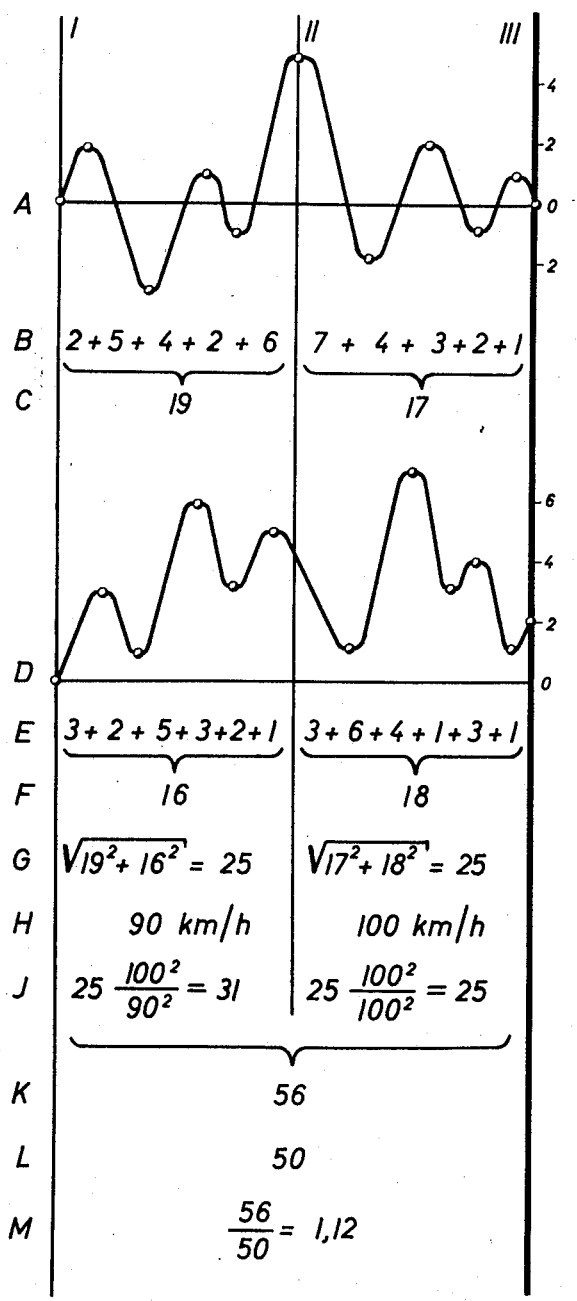

Referring first to FIG. 1, which illustrates the concept of the present invention, the curve in line A of the drawing shows the vertical accelerations measured in a vehicle moving over track sections I–II and II–III. The numerals in line B indicate the absolute changes in acceleration indicated by the curve in line A, line C indicating the sum of these absolute acceleration changes in the two track sections. Analogous curves, values and sums for the acceleration in a horizontal plane are given in lines D, E and F. The approximate vector sums of the sums are given in lines G and F (for the accelerations in two mutually perpendicular planes). Line H indicates the actual speeds of the vehicle in the two track sections in kilometers per hour. Line J gives the ratio of the squares of a comparison speed of 100 km/hr and the actual speeds, multiplied by the vector sum of line G.

Totalling the two parameters of line J, the value in line K reflects the sum of the acceleration changes in track section I–III, based on a comparison speed of 100 km/h. If as shown in line L, the experimentally obtained standard or normal parameter for a speed of 100 km/h is 50 for track section I–III, the track condition given in line M is reflected by the ratio of the actual value 56 to the standard value 50, i.e. 56 : 50 = 1.12. In other words, the track condition in track section I–III deviates from the standard condition by 12% and, therefore, requires correction.

In the illustrated example, the vector sums are given only approximately for track sections I–II and II–III. If computers are used, exact vector sums may readily be obtained even for very small track sections, for instance for lengths of a yard or less.

The invention may also be practiced without reference to the speed of the measuring car traveling over the track section whose condition is to be ascertained. If the incorrect position of the track or the individual track rails is considered as a succession of curves of the same mathematical function, for instance as circular arcs, the acceleration $f$ in each arc is determined by the equation $$f = V^2/13H,$$

wherein $v$ is the vehicle speed and $H$ is the radius of arc. In closely adjacent track points I and II, the respective accelerations will be $$fI = V^2/13H_I \text{ and } f_{II} = V^2/13H_2$$

The change in the acceleration between two closely adjacent points is equal to the difference of the accelerations:

$$f_I - f_{II} = \frac{V^2}{13}\left(\frac{1}{H_I} - \frac{1}{H_{II}}\right)$$

If the ordinate or height of the arc $h$ is measured at the point of division of a chord having the length $a+b$ meters (see FIG. 4), $h = (500ab/H)$ millimeters.

If it is desired to measure not $h$ but $h_I$, the equation is $$h_I = h \frac{a+b}{a}$$

or $$h_I = \frac{500(a+b)b}{H_I},$$

making $$\frac{1}{H_I} = \frac{h_I}{500(a+b)b}$$

Thus, $$f_I - f_{II} = \frac{V^2}{6500(a+b)b}(h_I - h_{II})$$

Therefore, as seen in FIG. 4, only the difference between the ordinates $h_I$ and $h_{II}$ positioned in space need be measured, and the proportional acceleration changes may be readily derived therefrom.

FIG. 2 shows a schematic side view of a surveying apparatus with two measuring bogies 4 and 5 which move on a track 3 which is curved in a vertical plane, the two bogies being held at a constant distance by a coupling rod K.

Two axles 1 and 2 of the measuring bogies 4, 5 are positioned approximately at the height of the point of gravity of conventional railroad cars. Centrally between the ridgly spaced bogies, the two axles of the bogies are spaced by distance $v$ which is proportional to the difference of the heights of the arcs of the curved track beneath the bogies.

FIG. 3 shows the same surveying apparatus in achematic top view, the track shown to be curved also in a horizontal plane. Thus, there is also a distance $w$ between the two axles 1 and 2 which is proportional to the difference of the heights of the arcs in the horizontal plane of the track.

In the geometrical projection of FIG. 4, there is shown the geometrical relationship between ordinate $h$ and $h_I$. Points $E_1$ and $E_2$ are the end points of axles 1 and 2 at the midpoint of the distance between the two measuring bogies. The distance $h_I - h_{II}$ constitutes the vector sum of the parameters $w$ and $v$. FIG. 5 shows the apparatus of FIGS. 2 and 3 in a schematic front view to illustrate this relationship.

The horizontal component $w$ and the vertical component $v$ may also be obtained by using a pendulum or a gyroscope, and the horizontal and vertical differences of acceleration may be determined by vectors, may be totalled continuously as the surveying apparatus moves over the track section, and the results may be compared continuously with a standard or norm to obtain an accurate picture of the track condition.

This condition may also be obtained by reading the results of a track surveying bogie which measures the vertical heights of the arc $l$ and $r$, respectively, of the left and right track rail as well as the horizontal height of the arc of the outer track rail in a curve. In this calculation, it is assumed that the position of the track rails projected into a horizontal and into a vertical plane is a succession of curves of the same mathematical function, for instance successive circular arcs.

Characteristic values of these arcs or the changes in these values are measured, for instance changes in the radius of the arcs, and the accelerations and/or changes in the acceleration in a horizontal and/or vertical direction are derived therefrom. The change in acceleration has been indicated above by the following equation:

$$f_I - f_{II} = \frac{V^2}{13}\left(\frac{1}{H_I} - \frac{1}{H_{II}}\right)$$

If the height of the arc $h$ is measured at the midpoint of a chord which is a meters long, $$h = \frac{125a^2}{H}$$

and, accordingly, $$\frac{1}{H} = \frac{h}{125a^2}$$

The acceleration change $f_I - f_{II}$ is thus derived from the change in the height of the arc.

The horizontal acceleration changes are obtained in changes of the horizontal curvature of the track with $$\frac{V^2}{1625a^2}(w_{ll} = w_r).$$

The acceleration changes for track superelevations are derived as follows:

An error in the superelevation produces a horizontal movement of the point of gravity. A sinuous error thus produces a sinuous movement of the point of gravity. Centrifugal accelerations in a horizontal direction of the following magnitude are exerted upon the point of gravity:

$$\frac{V^2}{1625a^2}[(r_{ll} - r_l) - (l_{ll} - l_l)]$$

The vertical acceleration changes for the point of gravity are $$\frac{V^2}{1625a^2}\left(\frac{r_{ll} - r_l}{2} + \frac{l_{ll} - l_l}{2}\right)$$

The combined acceleration change is $$\frac{V^2}{1625a^2}\sqrt{[(w_{ll} = w_l) + (r_{ll} - r_l) - (l_{ll} - l_l)]^2 + \left[\frac{r_{ll} - rr}{2} + \frac{l_{ll} - l_l}{2}\right]^2}$$

The differences between the heights of the arc are measured in a conventional manner, their vector sums are determined, and these sums are compared with a comparison norm.

FIG. 6 illustrates an apparatus for inductively measuring the distance. As shown, the end points $E_1$ and $E_2$ of the axles 1 and 2 of the two measuring bogies carry respective plates 6 and 6' whereon there are mounted windings 7 and 7', respectively, which preferably extend radially, as seen in the front view of FIG. 6a. Plate 6 is fixedly mounted on its' axle while plate 6' is axially movable towards and away from the axially fixed plate. Plate 6' is universally mounted on ball-and-socket joint 9 and biased against plate 6 by helical spring 8. Both plates are coated with an insulating film 10 for gliding contact between the plates. The winding 7 is in circuit with a source 11 of alternating current. The power lines emanating from winding 7 cut across winding 7' and there produce an induction current whose potential is measured by voltmeter 12. When the two plates are moved in relation to each other, the portions of the contacting surfaces are changed correspondingly, thus changing the induction current which, therefore, becomes a measure varying with the relative positions of the end points of the measuring bogie axles.

The plates 6, 6' may also be constituted as condensers, in which case the films 10 form the dielectric. The circuit for such an arrangement is shown in FIG. 7 wherein the plates 6, 6' form the condenser in circuit with a source 13 of alternating current of high frequency. When the two plates are moved in relation to each other, the ammeter 14 will indicate the electrical current corresponding to the varying areas of contact between the two plates.

It is also possible to mount on bogies 4 and 5, as well as on axles 1 and 2, accelerometers. The difference in the indicated values produces a measure of the track condition dependent on the measuring speed.

FIGS. 8 and 10 illustrate, by way of example, other apparatus mounted on the axle ends of the measuring bogies of determining their position relative to each other.

FIG. 8 illustrates mechanical measuring of the vertical distance between the ends $E_4$ and $E_5$ of the two bogies. Pulleys 16 and 17 are respectively mounted on the ends of the bogies, and a wire or rope 15 is trained over these pulleys and, if desired, an additional guide roller 18, one end of the wire or rope being fixedly anchored to one bogie end, i.e., $E_4$, while the other end of the wire or rope is attached to spring 19 on the other bogie to keep the wire or rope tensioned. The wire or rope moves a recording stylus 20 which records a curve 22 indicating the vertical distances $v$ on a paper band 21 or like record carrier. A like arrangement for the horzontal produces a record of the horizontal distances $w$.

FIGS. 9 and 10 are examples wherein the axle ends $E_1$ and $E_2$ carry plates 6a and 6b'. The plates carry electrical measuring instruments indicating the varying distances between the axle ends. In the illustrated embodiment, the instruments are windings receiving cores axially moving therethrough, the vertical distances being measured by instrument 23 and the horizontal distances by instrument 24. If the minor error derived from mutual rotation of the plates in respect of each other is neglected, the two instruments produce the components $v$ and $w$ indicating the varying distances of the axle ends.

Since the various electrical measuring instruments are well known, the drawing has not been encumbered with showing the current sources, circuits, amplifiers, etc.

Figure 11:
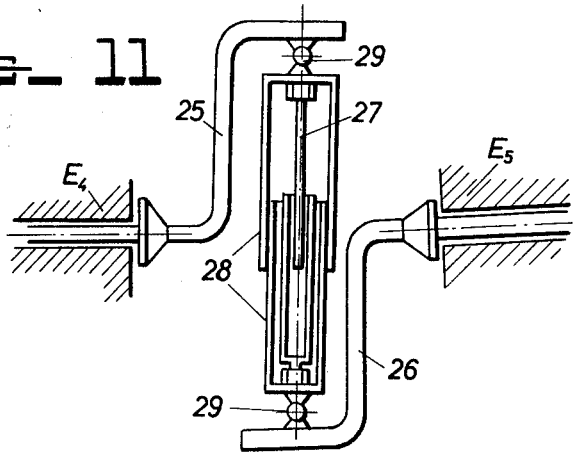

FIG. 11 shows an embodiment wherein the magnitude of the distance between the axle ends $E_4$ and $E_5$ is measured. The axle ends have respective brackets 25 and 26 rotatably mounted therein. An electrical measuring instrument 27 is mounted between the two brackets. Furthermore, a mechanical guide 28, which consists of two telescoping tubes, is also mounted between the brackets to protect the electrical measuring instrument 27 from all transverse forces. The mechanical guide is connected to the brackets by universal joints 29, 29 to enable even minor relative movements of the axles to be read by the electrical measuring instrument.

It is desirable to make it possible for an individual in charge of a track maintenance operation to determine the condition of a track section. Therefore, it is quite useful to provide an apparatus for carrying out the invention which may be readily transported. Such an apparatus may include instruments which may be mounted on conventional railway cars or measuring bogies for cooperation so as to produce the desired values. Such instruments may be mounted, for instance, at the ends of railway cars which are coupled together in a train so that the relative position of the car ends may be measured as the train passes over a track section whose condition is to be surveyed.

FIG. 12 illustrates such an arrangement by way of example. The instruments more fully described and illustrated in FIGS. 6 and 6a are mounted on a carrier 32 which may be carried by shoulder straps 30. Set screws 31 on the carrier are adjusted to mount the instruments properly on the ends of cars 4' and 5'. The carrier housings hold the circuitry and meters which record the readings.

A transportable instrument may also be mounted on any point of a railway car at the height of the point or gravity of the car and may be provided with an accelerometer of any suitable structure and adjusted to a predetermined frequency. Preferably, the accelerometer will measure acceleration in the horizontal as well as the vertical plane. The adjusted accelerometer will record no acceleration in track sections whose grade and/or superelevation meets the norm but will indicate acceleration changes only at track points departing from the norm. The recorded acceleration changes are amplified and the amplified signals are fed to a device which totals them for the track section to provide the desired comparison-value. Other modifications and variations will readily occur to those skilled in the art after benefiting from the present teaching without departing from the scope of this invention.

What is claimed is:

1. An apparatus for indicating the condition of a railway track section, comprising two associated and cooperating measuring bogies closely spaced along the track section in a tandem arrangement, each measuring bogie being mounted on the track section on at least two axles and responsive to the condition of the track section independently of the other measuring bogie, an element extending from each one of the bogies in the direction of the track section elongation, the elements extending towards each other, each of the elements carrying a measuring part, the measuring parts being constituted essentially by two carrying plates of substantially the same size being mounted on the bogies for movement therewith in a direction perpendicular to the axis of the track section in response to a corresponding movement by a respective one of the bogies caused by the condition of the track section during their movement along and over the track section, the two plates extending substantially perpendicularly to the track section axis and having glidingly contacting surfaces an electrically insulating film on each of the surfaces, radially extending windings carried by each of the plates, an alternating current source in circuit with the windings on one of the plates, whereby the moving plates cooperate to produce signals indicating the relative position of the moving bogies, means for recording the signals, and the windings on the other plate being in circuit with the recording means.

2. The apparatus of claim 1, further comprising spring means biasing the two plates towards each other.

3. The apparatus of claim 1, wherein the measuring parts and the electrical circuit connected thereto, together with the recording means, forms a portable unit removably mountable on the measuring bogies.

4. An apparatus for indicating the condition of a railway track section, comprising two associated and cooperating measuring bogies closely spaced along the track section in a tandem arrangement, each measuring bogie being mounted on the track section on at least two axles and responsive to the condition of the track section independently of the other measuring bogie, an element extending from each one of the bogies in the direction of the track section elongation, the elements extending towards each other, each of the elements carrying a measuring part, the measuring parts being constituted essentially by two metallic condenser plates of substantially the same size being mounted on the bogies for movement therewith in a direction perpendicular to the axis of the track section in response to a corresponding movement by a respective one of the bogies caused by the condition of the track section during their movement along and over the track section, the two plates extending substantially perpendicularly to the track section axis and having glidingly contacting surfaces, an electrically insulating dielectric between the contacting surfaces whereby the moving plates cooperate to produce capacity signals indicating the relative position of the moving bogies, an alternating current source in circuit with the plates, means for recording the signals, and the recording means being arranged in said circuit.

5. The apparatus of claim 4, further comprising spring means biasing the two condenser plates towards each other.

6. The apparatus of claim 4, wherein the measuring parts and the electrical circuit connected thereto, together with the recording means, forms a portable unit removably mountable on the measuring bogies.

7. An apparatus for indicating the condition of a railway track section, comprising two associated and cooperating measuring bogies closely spaced along the track section in a tandem arrangement, each measuring bogie being mounted on the track section on at least two axles and responsive to the condition of the track section independently of the other measuring bogie, an element extending from each one of the bogies in the direction of the track section elongation, the elements extending towards each other, each of the elements carrying a measuring part, the measuring parts being adjacent each other and being mounted on the bogies for movement therewith in a direction substantially perpendicularly in respect of each other and perpendicular to the axis of the track section in response to a corresponding movement by a respective one of the bogies caused by the condition of the track section during their movement along and over the track section, the moving measuring parts cooperating to produce electrical measuring signals indicating the relative positions of the moving bogies, and means for recording the signals.

8. The apparatus of claim 7, wherein one of the parts is an electrical winding and the other part is an electrical core arranged for moving axially in respect of the winding.

9. The apparatus of claim 7, further comprising protective housings containing the respective measuring parts, the housings being telescoped into each other, and a universal joint mounting each of the housings on a respective one of the elements.

* * * * *